(12) United States Patent
Olson

(10) Patent No.: US 8,500,883 B2
(45) Date of Patent: Aug. 6, 2013

(54) APPARATUS AND SYSTEM FOR FILTERING AIR

(75) Inventor: Karmin Lorraine Olson, Kansas City, MO (US)

(73) Assignee: General Electric Company, Schenectady, NY (US)

( * ) Notice: Subject to any disclaimer, the term of this patent is extended or adjusted under 35 U.S.C. 154(b) by 581 days.

(21) Appl. No.: 12/175,635

(22) Filed: Jul. 18, 2008

(65) Prior Publication Data

US 2010/0011720 A1    Jan. 21, 2010

(51) Int. Cl.
*B01D 53/02* (2006.01)

(52) U.S. Cl.
USPC ............. 96/135; 55/341.1; 55/522; 55/523; 55/524

(58) Field of Classification Search
USPC .............. 96/135; 55/341.1, 522, 523, 524
See application file for complete search history.

(56) References Cited

U.S. PATENT DOCUMENTS

| | | | | |
|---|---|---|---|---|
| 4,096,227 A | * | 6/1978 | Gore | 264/110 |
| 4,415,342 A | * | 11/1983 | Foss | 95/107 |
| 4,985,296 A | * | 1/1991 | Mortimer, Jr. | 428/220 |
| 5,269,835 A | * | 12/1993 | Jensen | 95/279 |
| 5,324,579 A | | 6/1994 | Sassa et al. | |
| 5,527,569 A | | 6/1996 | Hobson et al. | |
| 6,008,146 A | * | 12/1999 | Stark | 442/199 |
| 6,517,612 B1 | * | 2/2003 | Crouch et al. | 95/277 |
| 6,955,708 B1 | * | 10/2005 | Julos et al. | 95/59 |
| 7,438,736 B1 | * | 10/2008 | Grey | 55/341.2 |
| 2001/0029843 A1 | * | 10/2001 | Minoru et al. | 96/135 |
| 2007/0075013 A1 | * | 4/2007 | Duong et al. | 210/500.36 |
| 2007/0075014 A1 | | 4/2007 | Olson et al. | |
| 2007/0077407 A1 | * | 4/2007 | Olson et al. | 428/304.4 |
| 2008/0011676 A1 | * | 1/2008 | Olson | 210/500.36 |

FOREIGN PATENT DOCUMENTS

| | | |
|---|---|---|
| DE | 4137627 A1 | 11/1991 |
| GB | 1117900 A1 | 6/1968 |
| GB | 1376888 A1 | 12/1974 |
| JP | 8209489 A1 | 2/1995 |
| JP | 2004230217 A | 8/2004 |
| JP | 2004290858 A | 10/2004 |
| JP | 2005334758 A | 12/2005 |
| WO | 9312281 A1 | 6/1993 |
| WO | 9715375 A1 | 5/1997 |
| WO | 9911355 A1 | 3/1999 |

OTHER PUBLICATIONS

International Search Report of the Intellectual Property Office dated Nov. 2, 2009 regarding application No. GB0912148.4; 2 pages.
GB Search Report dated Jun. 18, 2012 from corresponding Application No. GB0912148.4.

* cited by examiner

*Primary Examiner* — Christopher P Jones
(74) *Attorney, Agent, or Firm* — Armstrong Teasdale LLP

(57) ABSTRACT

A filter media for use in an inlet air filtration system includes a woven glass material and an amount of carbon impregnated within the woven glass material.

17 Claims, 4 Drawing Sheets

APPARATUS AND SYSTEM FOR FILTERING AIR

BACKGROUND OF THE INVENTION

The field of the invention relates generally to filtration systems for use in removing particulate matter from a stream of gas, and more particularly, to a filtration method and system that includes a conductive filter media.

Fabric filtration is a common technique for use in separating particulate matter from an air stream. Fabric filtration is often accomplished in a device known as a baghouse. A typical "reverse air" baghouse has a housing with an inlet chamber and an outlet chamber. The two chambers are separated by sheet metal, commonly referred to as a tubesheet. The tubesheet is typically located in the lower area of this type of baghouse. The tubesheet has a number of openings around which mounting thimbles are welded.

Filter bags are supported in the baghouse. The filter bags are attached at their lower end portions to respective mounting thimbles. The filter bags extend upwardly in the outlet chamber and are attached at an upper end portion to support structure. The filter bags are generally connected to attachments or tensioning devices at their upper end portions.

Particulate-laden gas is directed into the inlet chamber. The gas flows through the opening in the tubesheet, thimbles and filters into the outlet chamber. Particulates are separated from the gas stream at internal surfaces of the filter bags. The filtered gas is exhausted from the outlet chamber or directed for other uses. The filter bags are often made from a substantially non-conductive woven fiberglass filtration media material, or any other suitable filtration media such as knit or felt synthetic material.

The filter bags are periodically cleaned by reversing the flow of gas in the baghouse. In order to prevent the filer bag from collapsing inwardly on itself and restrict or pinch off cleaning gas flow, anti-collapse rings made from metal are attached to the filter bags. Ring covers attach the anti-collapse rings to the filter bags and are typically formed from woven fiberglass fabric that is folded and then sewn to form a pocket which contains the anti-collapse ring.

Often the inlet gas may contain flammable or ignitable material. This material may be ignited by sparks or discharge of built up static electricity. In some applications, static electrical charges tend to build up on isolated metal components of a filter bag. The static charges can cause process dust to accumulate unevenly on the filter media, tending to agglomerate near the location of the anti-collapse rings. A static charge allowed to build up creates a potential of a spark discharge to other nearby metal components. In some process dust applications, such a discharge could ignite the process dust or ignitable material to causes a fire or explosion in the baghouse. For safety, it would be desirable to remove and/or prevent the built-up static charges to prevent spark discharges.

BRIEF DESCRIPTION OF THE INVENTION

In one aspect, a filter media for use in an inlet air filtration system is provided. The filter media includes a woven glass material and an amount of carbon impregnated within the woven glass material.

In another aspect, an electrically conductive filtration media for use in separating particulate matter from a stream of gas is provided. The electrically conductive filtration media includes a conductive base material and a porous membrane laminated to the conductive base material.

In a further aspect, an inlet air filtration system is provided. The inlet air filtration system includes a filtration bag including a carbon impregnated woven glass material.

DETAILED DESCRIPTION OF THE INVENTION

Figure 1:
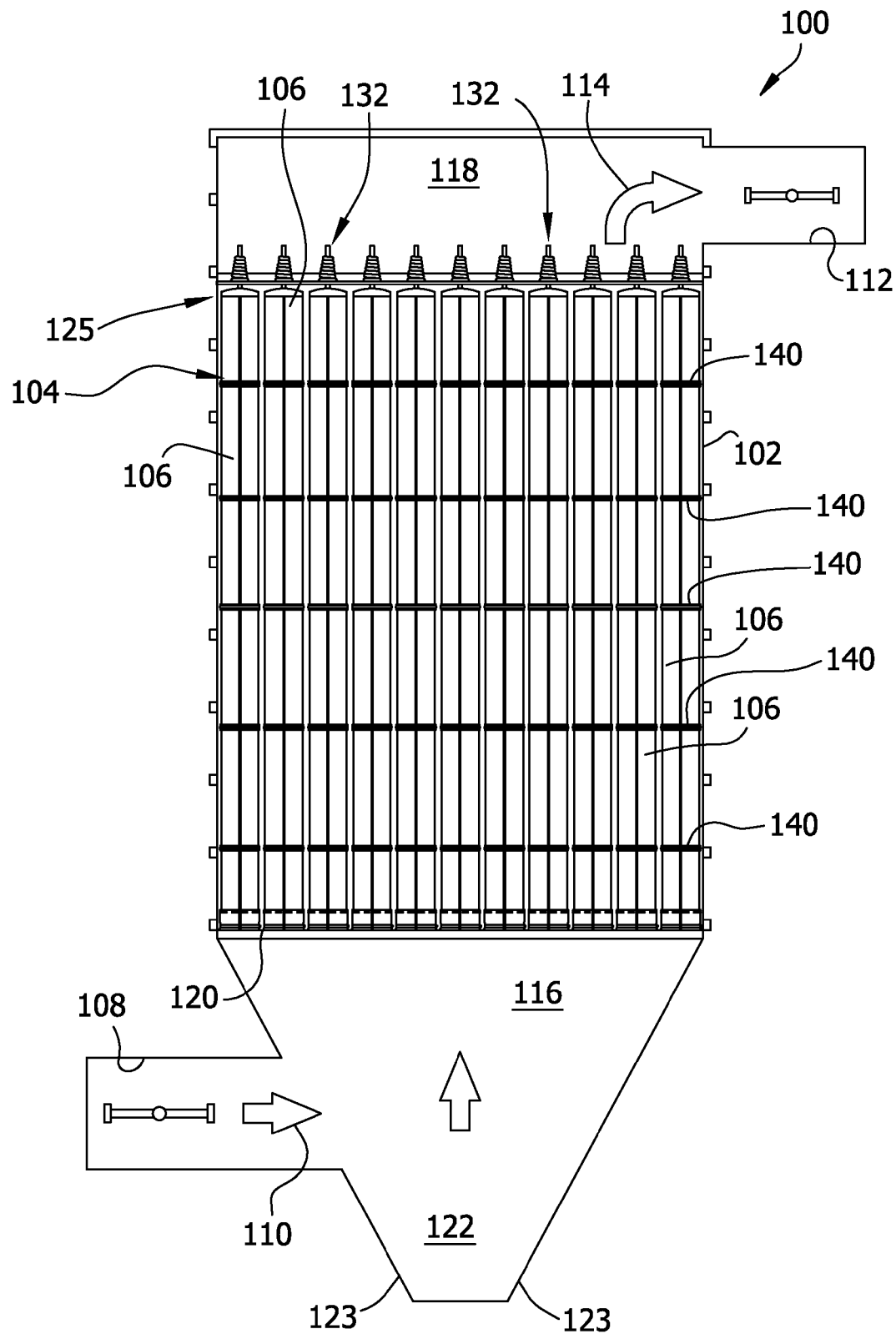
FIG. 1 is a schematic illustration of an exemplary baghouse.

FIG. 1 is a schematic illustration of an exemplary baghouse 100. In the exemplary embodiment, baghouse 100 includes a housing 102 and a plurality of filter assemblies 104 that are positioned within housing 102. Each filter assembly 104 includes a filter bag 106. Although filter bag 106 as illustrated has a circular cross-section, it should be apparent to one of ordinary skill in the art, that the filter element may have other suitable cross-sectional profiles, such as an elliptical or rectangular cross-sectional profile. Further, it should be understood that filter assemblies 104 may be arranged in a vertically-extending matrix in a typical housing 102 as is known in the baghouse industry. Baghouse 100 also includes an inlet 108 that is oriented to receive a stream of particulate-laden gas 110 and an outlet 112 that enables a stream of cleaned gas 114 to be discharged from baghouse 100.

Housing 102 is divided into a first plenum 116 and a second plenum 118 by a cell plate 120. Cell plate 120 may be formed of any suitable material, such as a metal plate or sheet. Inlet 108 is positioned in flow communication with first plenum 116, and outlet 112 is positioned in flow communication with second plenum 118. In the exemplary embodiment, an accumulation chamber 122 at a lower end of first plenum 116 is defined by sloped walls 123. More specifically, in the exemplary embodiment, accumulation chamber 122 has a V-shaped cross-sectional profile. In one embodiment, a baffle (not shown) is included within first plenum 116. Baghouse 100 also includes a support structure 124 that is positioned at a closed end 125 of filter assemblies 104, as is described in more detail below. Cellplate 120 may include thimbles (not shown) that extend from cellplate 120 for use in coupling cellplate 120 to filter bag 106. Additionally, in the exemplary embodiment, baghouse 100 also includes a reverse flow subsystem (not shown) to facilitate removing dust or other particulate matter from filter bag 106. The reverse flow subsystem may include a fan (not shown), wherein the size of the fan is selected based on a fixed volume of air that needs to be handled within baghouse 100.

Figure 2:
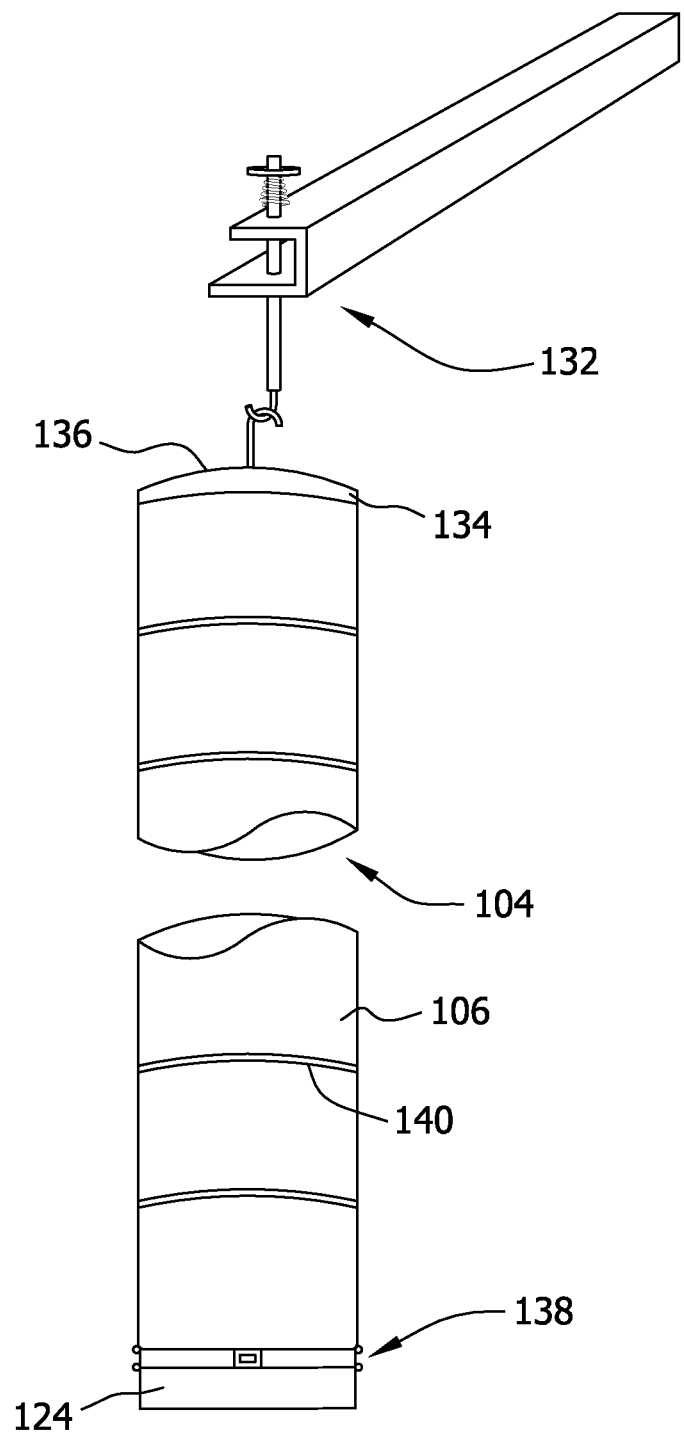
FIG. 2 is a schematic illustration of an exemplary filter element that may be used in the baghouse shown in FIG. 1.

In the exemplary embodiment, a plurality of filter assemblies 104 are suspended from tensioning assembly 132. More specifically, in the exemplary embodiment, each filter assembly 104 is supported at closed end 125 by support structure 124 and extends vertically upward therefrom. In the exemplary embodiment, each filter assembly 104 hangs from a tensioning assembly 132, as shown in FIG. 2. Moreover, each filter assembly 104 includes a compression band 134 that is used to couple filter bag 106 to a cap 136 extending from tensioning assembly 132. A clamp 138 couples filter bag 106 to cellplate 120. Further, in the exemplary embodiment, filter bag 106 includes at least one anti-collapse ring 140 that facilitates maintaining filter bag 106 in an open position during a reverse air cleaning process. Anti-collapse ring 140 may be formed from a metal material.

Filter bag 106 can be any suitable filter type. For example, filter bag 106 may be a woven bag filter, a nonwoven bag filter, and/or any combination thereof. In the exemplary embodiment, filter bag 106 includes a woven filter media that is formed in a substantially tubular shape with a plurality of anti-collapse rings 140 sewn into filter bag 106 at regular intervals along the bag length, wherein the number of anti-collapse rings 140 included within filter bag 106 is dependent upon the length of filter bag 106. Filter bag 106 can be of any suitable length. For example, in one embodiment, filter bag 106 is between about 10 to 40 feet in length. Further, filter bag 106 can be of any suitable diameter. In one embodiment, filter bag 106 is between about 5-18 inches in diameter.

Figure 3:
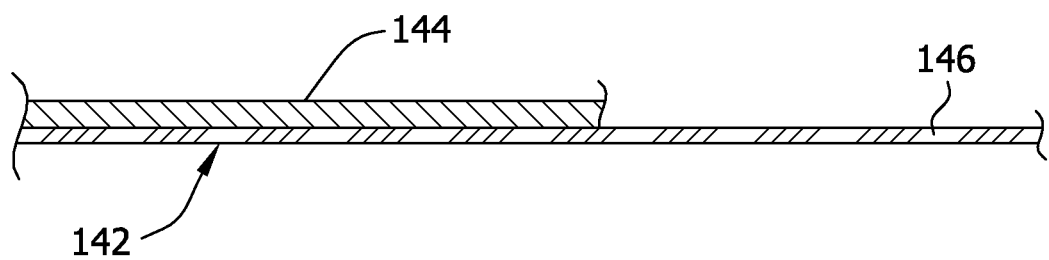
FIG. 3 is a schematic sectional view of an exemplary filter media that may be used in the baghouse shown in FIG. 1.

FIG. 3 is a schematic sectional view of an exemplary embodiment of a filter media 142 that may be used in baghouse 100. In the exemplary embodiment, filter media 142 includes a conductive base material 144 and a porous membrane 146. Moreover, in the exemplary embodiment, base material 144 includes woven glass impregnated with carbon. In the exemplary embodiment, the amount of carbon impregnated within the woven glass accounts for less than about 5% of the total weight of filter media 142. In an alternative embodiment, the amount of carbon impregnated within the woven glass accounts for less than about 2% of the total weight of filter media 142. In a further embodiment, the amount of carbon impregnated within the woven glass accounts for less than about 1% of the total weight of filter media 142. In the exemplary embodiment, filter media 142 also includes a porous membrane 146 that includes expanded polytetrafluoroethylene (ePTFE). In an alternative embodiment, filter media 142 does not include such a porous membrane. In the exemplary embodiment, conductive base material 144 has an electrical resistance of less than 500 megaohm (MΩ). In an alternative embodiment, conductive base material 144 has an electrical resistance of less than 300 MΩ. In another embodiment, conductive base material 144 has an electrical resistance of less than 1 MΩ.

By impregnating the woven glass media with an amount of carbon, the ionic conductivity of filter media 142 is increased. In the exemplary embodiment, the carbon impregnated into the woven glass is in the form of solid carbon particles, and can be provided in a dispersion to facilitate impregnating the carbon particles into filter media 142. As is known, dust particles, or other particulate matter, generally have a positive charge with respect to the electronegative charge of porous membrane 146. Accordingly, the increased ionic conductivity of filter media 142 facilitates dissipating the charge between the dust or particulate matter and filter media 142 and also enables the dust to be more easily released from the surface of filter media 142 during a cleaning process. Moreover, by increasing the ionic conductivity of filter media 142, an amount of dust or other particulate matter attracted to filter media 142 is facilitated to be reduced, such that an overall pressure differential through baghouse 100 is decreased. Further, in the exemplary embodiment, base material 144 is treated with a PTFE material to enable porous membrane 146 to be laminated to base material 144. In one embodiment, porous membrane 146 is thermally laminated to base material 144. In another embodiment, porous membrane 146 is adhesively bonded to base material 144.

During operation, stream 110 enters first plenum 116 through inlet 108. A fan may be used to facilitate the movement of stream 110 through baghouse 100. As stream 110 is channeled through an interior portion of filter bags 106, particulate matter entrained within stream 110 is separated by filter bags 106 and either accumulates on or in filter bags 106, or is separated from stream 110 and falls to plenum lower portion 122. A stream of cleaned gas 114 is then channeled from the interior of filter bags 106 and into second plenum 118. Ultimately, the stream of cleaned gas 114 is discharged from baghouse 100 through outlet 112.

Figure 4:
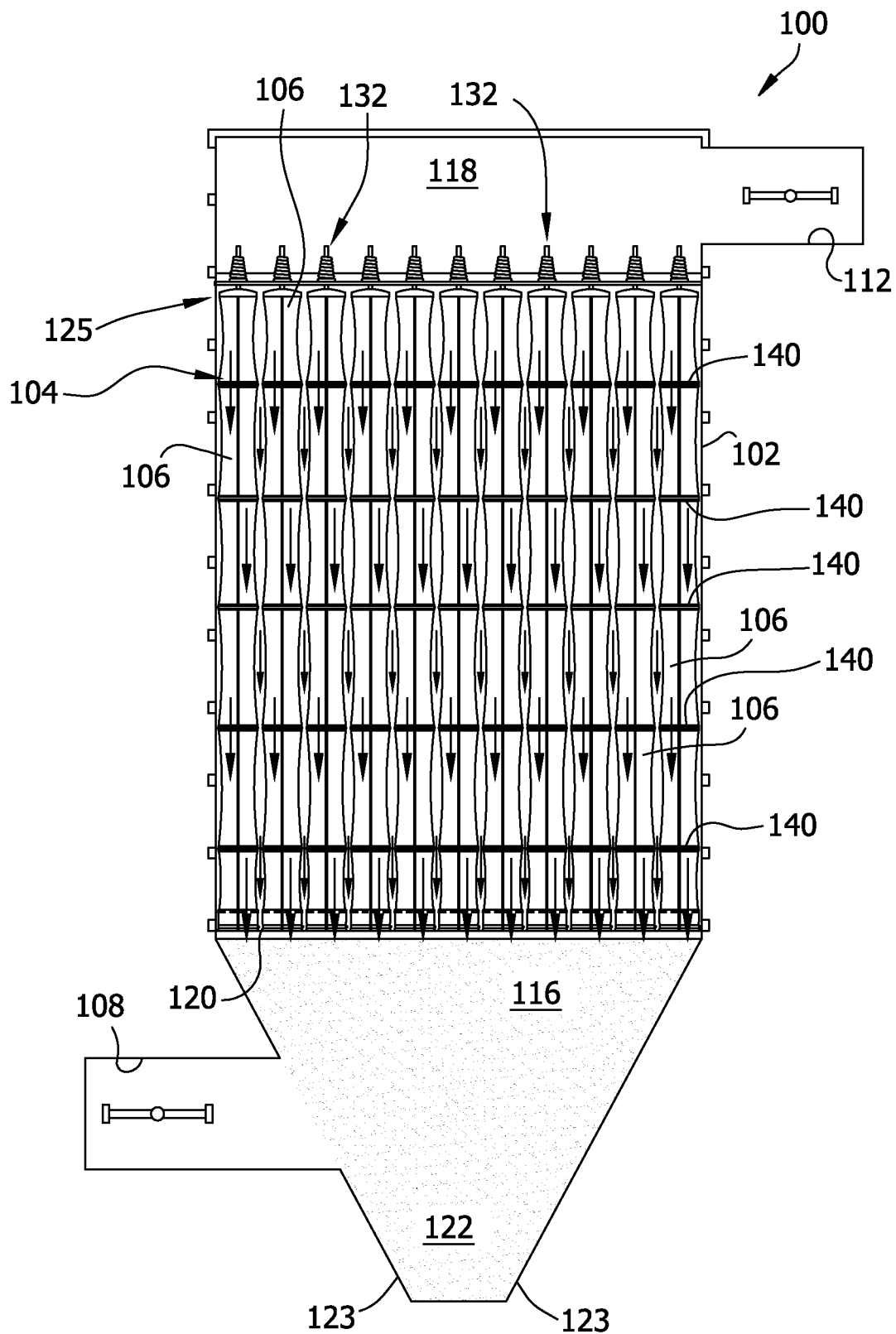
FIG. 4 is a schematic illustration of the baghouse shown in FIG. 1 and in a cleaning mode of operation.

Baghouse 100 may undergo a cleaning mode of operation to facilitate removing additional dust or other particulate matter from filter assemblies 104. FIG. 4 is a schematic illustration of baghouse 100 in such a configuration. As shown in FIG. 4, the arrows illustrate the direction of fluid flow. A reverse flow sub-system supplies fluid flow in a reverse direction from the normal filtering flow operations to facilitate dislodging caked dust or other particulate matter formed on a surface of filter bag 106. The reverse flow sub-system may include, but is not limited to only included, a plurality of pumps or fans, ducting and isolation dampers that induce and/or direct fluid flow from the sub-system into baghouse 100. A force induced by the reverse fluid flow may dislodge a substantial portion of caked dust or other particulate matter that has accumulated on or in filter bag 106 during filtration mode operations. Dust or other particulate matter that is dislodged becomes entrained in the reverse fluid flow stream and is carried into accumulation chamber 122. In an alternative embodiment, an apparatus (not shown) that induces mechanical vibrations into filter assemblies 104 may be used to selectively shake assemblies 104 to further dislodge particulate matter from filter bag 106.

Reverse flow may induce a sufficient force on filter bag 106 to collapse filter bag 106 inward. Such a condition may reduce the effectiveness of the cleaning operation by at least partially collapsing filter bag 106. However, in the exemplary embodiment, anti-collapse ring 140 facilitates maintaining filter bag 106 in a substantially cylindrical shape and facilitates preventing filter bag 106 from completely collapsing during reverse flow cleaning operations.

The methods and systems described herein facilitate removing dust or other particulate matter from a gas stream via a filter media and also facilitate the removal of such dust or particulate matter from the filter media in a cleaning operation. Specifically, by increasing the conductivity of a filter media, a static charge between dust or other particulate matter and the filter media is decreased. Accordingly, a pressure drop through the filter media is decreased. Moreover, the increased ionic conductivity of the filter media facilitates the removal of dust or other particulate matter from the filter media during a reverse flow cleaning operation. The above description is intended to cover a specific example of the general process for removing dust or other particulate matter from a gas stream and for cleaning such dust or particulate matter from a filter media used to do so, and should not be found limited to the specific embodiment described.

Exemplary embodiments of reverse-air baghouses and filter media used within such baghouses are described above in detail. The methods and systems are not limited to the specific embodiments described herein nor to the specific illustrated baghouse or filter media, but rather, steps of the method and/or components of the system may be utilized independently and separately from other steps and/or components described herein. Further, the described method steps and/or system components can also be defined in, or used in combination with, other methods and/or systems, and are not limited to practice with only the method and system described herein. The description above is meant to cover a specific example of the general process for removing dust or other particulate matter from a gas stream and for cleaning such dust or particulate matter from a filter media used to do so, and should not be found limited to the specific embodiment described.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A filter media for use in an inlet air filtration system, said filter media comprising: a plurality of anti-collapse rings sewn into a filter bag such that said plurality of anti-collapse rings are spaced substantially even along a length of the filter bag at regular intervals; a woven glass material coupled to said plurality of anti-collapse rings; and an amount of carbon impregnated within said woven glass material forming a carbon impregnated woven glass material, the carbon impregnated woven glass material being ionically conductive, wherein the carbon impregnated woven glass material is treated with a polytetrafluoroethylene material to facilitate laminating a porous membrane to the carbon impregnated woven glass material.

2. A filter media in accordance with claim 1, wherein said filter media comprises less than about 5 weight percent carbon, based on said filter media total weight.

3. A filter media in accordance with claim 1, wherein said filter media comprises less than about 2 weight percent carbon, based on said filter media total weight.

4. A filter media in accordance with claim 1, wherein said filter media comprises less than about 1 weight percent carbon, based on said filter media total weight.

5. A filter media in accordance with claim 1, wherein said filter media has an electrical resistance of less than about 500 MΩ.

6. A filter media in accordance with claim 1, wherein said filter media has an electrical resistance of less than about 300 MΩ.

7. A filter media in accordance with claim 1, wherein said filter media has an electrical resistance of less than about 1 MΩ.

8. A conductive filtration media for use in separating particulate matter from a stream of gas, said filtration media comprising: a plurality of anti-collapse rings sewn into a filter bag such that said plurality of anti-collapse rings are spaced substantially even along a length of the filter bag at regular intervals; a conductive base material coupled to said plurality of anti-collapse rings, wherein said conductive base material comprises a woven glass material impregnated with an ionically conductive material that comprises carbon; and a porous membrane laminated to said conductive base material, wherein said conductive base material is treated with a polytetrafluoroethylene material to facilitate laminating said porous membrane to said conductive base material.

9. A conductive filtration media in accordance with claim 8, wherein said porous membrane comprises an expanded polytetrafluoroethylene material.

10. A conductive filtration media in accordance with claim 8, wherein said conductive filtration media comprises less than about 5 weight percent carbon, based on said filter media total weight.

11. A conductive filtration media in accordance with claim 8, wherein said conductive filtration media comprises less than about 2 weight percent carbon, based on said filter media total weight.

12. A conductive filtration media in accordance with claim 8, wherein said conductive filtration media comprises less than about 1 weight percent carbon, based on said filter media total weight.

13. A conductive filtration media in accordance with claim 8, wherein said conductive base material has an electrical resistance of less than about 500 MΩ.

14. A conductive filtration media in accordance with claim 8, wherein said conductive base material has an electrical resistance of less than about 300 MΩ.

15. A conductive filtration media in accordance with claim 8, wherein said conductive base material has an electrical resistance of less than about 1 MΩ.

16. An inlet air filtration system, said inlet air filtration system comprising: a filtration bag comprising a filter media comprising a plurality of anti-collapse rings coupled to said filtration bag such that said plurality of anti-collapse rings are spaced substantially even along a length of said filtration bag at regular intervals, said filter media further comprising a carbon impregnated woven glass material, said carbon impregnated woven glass material being ionically conductive, said carbon impregnated woven glass material treated with a polytetrafluoroethylene material to facilitate laminating a porous membrane to said carbon impregnated woven glass material.

17. An inlet air filtration system in accordance with claim 16, wherein said porous membrane includes expanded polytetrafluoroethylene.

* * * * *